（12) United States Patent
Lee et al.

(10) Patent No.: US 11,283,101 B2
(45) Date of Patent: Mar. 22, 2022

(54) METHOD OF PREPARING ELECTRODES HAVING UNIFORM QUALITY AND ELECTRODE ASSEMBLY PREPARATION METHOD INCLUDING THE SAME

(71) Applicant: LG CHEM, LTD., Seoul (KR)

(72) Inventors: Dae Won Lee, Cheong-si (KR); Ki Eun Sung, Sejong (KR); Jun Wan Kim, Pyeongtaek-si (KR); Dong Hyeuk Park, Cheongju-si (KR); Hyun Jin Jeon, Cheongju-si (KR); Jae Hong Kim, Cheongju-si (KR); Sang Wook Kim, Cheongju-si (KR); Hak Sik Lee, Cheongju-si (KR); Sung Chul Park, Cheongju-si (KR); Jeong Ki Kim, Daejeon (KR)

(73) Assignee: LG Energy Solution, Ltd.

( * ) Notice: Subject to any disclaimer, the term of this patent is extended or adjusted under 35 U.S.C. 154(b) by 82 days.

(21) Appl. No.: 16/082,795

(22) PCT Filed: Aug. 28, 2017

(86) PCT No.: PCT/KR2017/009368
§ 371 (c)(1),
(2) Date: Sep. 6, 2018

(87) PCT Pub. No.: WO2018/048126
PCT Pub. Date: Mar. 15, 2018

(65) Prior Publication Data
US 2019/0081345 A1      Mar. 14, 2019

(30) Foreign Application Priority Data

Sep. 8, 2016  (KR) .................. 10-2016-0115781
Aug. 22, 2017 (KR) .................. 10-2017-0105860

(51) Int. Cl.
*H01M 10/04* (2006.01)
*H01M 10/058* (2010.01)
(Continued)

(52) U.S. Cl.
CPC .......... *H01M 10/052* (2013.01); *H01M 4/04* (2013.01); *H01M 4/0404* (2013.01);
(Continued)

(58) Field of Classification Search
None
See application file for complete search history.

(56) References Cited

U.S. PATENT DOCUMENTS 6,682,848 B1  1/2004 Yano et al.
7,695,864 B2  4/2010 Miyahisa et al.
(Continued)

FOREIGN PATENT DOCUMENTS

JP      9-147851 A    6/1997
JP   2000-315498 A   11/2000
(Continued)

OTHER PUBLICATIONS

KR-20060080092-A translation (Year: 2006).*
International Search Report (PCT/ISA/210) issued in PCT/KR2017/009368, dated Dec. 11, 2017.

*Primary Examiner* — Ula C Ruddock
*Assistant Examiner* — Amanda Rosenbaum
(74) *Attorney, Agent, or Firm* — Lerner, David, Littenberg, Krumholz & Mentlik, LLP (57) ABSTRACT

A method of preparing an electrode for an electrode assembly having a structure in which electrodes are laminated, including:
(i) a process of coating an electrode mixture on at least one surface of a metal sheet so that n (n≥2) electrode mixture coated layer lines are formed between non-coated portions parallel to a first direction;
(Continued)

(ii) a process of rolling the metal sheet sequentially from a first electrode mixture coated layer line to an $n^{th}$ electrode mixture coated layer line using a rolling roller rotated in a second direction perpendicular to the first direction;

(iii) a process of slitting the rolled metal sheet at least twice in the second direction to prepare electrode plate base materials having n electrode mixture coated layers formed thereon; and (iv) a process of cutting each of the electrode plate base materials in the first direction to obtain n single sheet electrodes.

7 Claims, 9 Drawing Sheets

(51) Int. Cl.
　　*H01M 10/0585*　　(2010.01)
　　*H01M 4/02*　　(2006.01)
　　*H01M 4/04*　　(2006.01)
　　*H01M 4/139*　　(2010.01)
　　*H01M 4/70*　　(2006.01)
　　*H01M 10/052*　　(2010.01)
　　*H01M 4/66*　　(2006.01)

(52) U.S. Cl.
　　CPC ......... *H01M 4/0435* (2013.01); *H01M 4/139* (2013.01); *H01M 4/661* (2013.01); *H01M 4/70* (2013.01); *H01M 10/058* (2013.01); *H01M 10/0585* (2013.01); *H01M 2004/027* (2013.01); *H01M 2004/028* (2013.01)

(56) References Cited

U.S. PATENT DOCUMENTS

| | | | |
|---|---|---|---|
| 10,067,113 | B2 | 9/2018 | Hallinan et al. |
| 2001/0012588 | A1* | 8/2001 | Kaido ................. H01M 4/0402 429/233 |
| 2006/0153972 | A1* | 7/2006 | Hirokawa .............. H01G 11/86 427/79 |
| 2009/0269609 | A1 | 10/2009 | Hirayama |
| 2013/0019732 | A1* | 1/2013 | Yotsumoto ........ H01M 10/0585 83/331 |
| 2014/0227582 | A1* | 8/2014 | Nakashima ....... H01M 10/0585 429/162 |

FOREIGN PATENT DOCUMENTS

| | | | |
|---|---|---|---|
| JP | 3146439 | B2 | 3/2001 |
| JP | 3257877 | B2 * | 2/2002 |
| JP | 2002-343350 | A | 11/2002 |
| JP | 2002343350 | A * | 11/2002 |
| JP | 2007-329050 | A | 12/2007 |
| JP | 2007329050 | A * | 12/2007 |
| JP | 2014-22149 | A | 2/2014 |
| JP | 2014-137944 | A | 7/2014 |
| JP | 2016062864 | A * | 4/2016 |
| JP | 2016-139561 | A | 8/2016 |
| JP | 2016139561 | A * | 8/2016 |
| KR | 10-0545954 | B1 | 1/2006 |
| KR | 20060080092 | A * | 7/2006 |
| KR | 10-2008-0036741 | A | 4/2008 |
| KR | 10-2013-0085828 | A | 7/2013 |
| KR | 10-2015-0122940 | A | 11/2015 |
| KR | 10-2015-0124611 | A | 11/2015 |
| KR | 10-2016-0127031 | A | 11/2016 |

\* cited by examiner

PRIOR ART

PRIOR ART

METHOD OF PREPARING ELECTRODES HAVING UNIFORM QUALITY AND ELECTRODE ASSEMBLY PREPARATION METHOD INCLUDING THE SAME

TECHNICAL FIELD

The present disclosure relates to a method of preparing electrodes having uniform quality and a method of preparing an electrode assembly including the same.

BACKGROUND ART

Recently, rechargeable secondary batteries have been widely used as energy sources for wireless mobile devices. Further, secondary batteries are attracting attention as a power source for electric vehicles (EVs), hybrid EVs (HEVs), plug-in HEVs, and the like, which have been proposed as a solution to a problem of air pollution generated by conventional gasoline vehicles and diesel vehicles using fossil fuel. The secondary batteries are also used in power tools, electric bikes (E-bikes), electric scooters (E-scooters), electric golf carts, or power storage systems which require high output power.

In terms of a shape of the secondary battery, there is a high demand for a prismatic type secondary battery and a pouch-type secondary battery that can be applied not only to products such as mobile phones having a thin thickness, but also to medium- and large-sized devices such as vehicles and electric power storage systems by a plurality of secondary batteries being combined and laminated in a middle- or large-sized pack structure. Further, in terms of a material of the secondary battery, there is a high demand for lithium secondary batteries such as lithium ion batteries and lithium ion polymer batteries having advantages such as high energy density, discharge voltage, output stability, and the like.

Further, secondary batteries may be classified according to a structure of an electrode assembly composed of a positive electrode, a negative electrode, and a separator. Typical examples are a jelly-roll type (wound type) electrode assembly having a structure in which long sheet-type positive electrodes and negative electrodes are wound while a separator is interposed between the positive electrode and negative electrode, a stacked type (laminated type) electrode assembly in which a large number of positive electrodes and negative electrodes cut in units of a predetermined size are sequentially laminated with a separator interposed between the positive electrode and negative electrode, and a stacked/folded type electrode assembly having a structure in which bi-cells or full cells in which predetermined units of positive and negative electrodes are laminated with a separator interposed between the positive electrode and negative electrode are wound.

Here, a process of preparing an electrode assembly having a laminated structure of a unit electrode includes a process of preparing positive and negative electrode mixtures, a process of applying each of the mixtures to a positive electrode current collector and a negative electrode current collector to prepare sheet type positive and negative electrodes, a process of forming an electrode tab on the electrodes, a process of rolling the electrodes, a process of slitting the electrodes to a desired size to prepare the electrodes, a process of vacuum drying, and a process of forming an electrode assembly composed of the prepared positive and negative electrodes and a separator.

In particular, when a laminated type electrode assembly or a stacked/folded type electrode assembly is being prepared, a process of upwardly laminating a single sheet of electrodes is required, and thus a process of preparing the single sheet of electrodes is previously performed.

Figure 1:
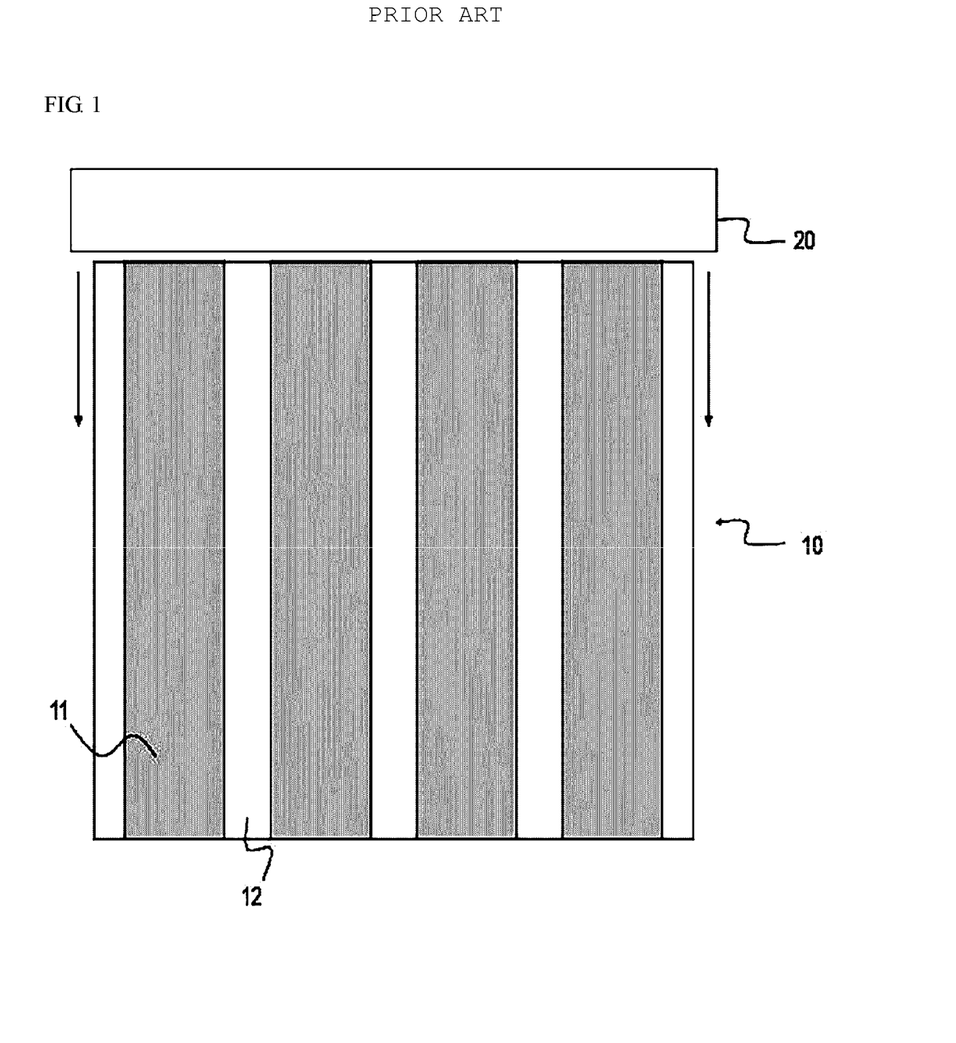
FIG. 1 is a schematic diagram of an electrode sheet according to the related art.

In this regard, FIG. 1 shows an electrode sheet according to the related art for preparing a single sheet of electrodes.

Referring to FIG. 1, an electrode sheet 10 is formed on a metal sheet in a state in which electrode lines 11 containing an electrode mixture are interposed between non-coated portions 12 which are uncoated areas.

The electrode sheet 10 is rolled while a rolling roller 20 is rotated in a longitudinal direction corresponding to the electrode lines. In this process, a pressure is applied only to the electrode lines 11 but is not applied to the non-coated portions 12 between the electrode lines 11, and thus the entire electrode sheet 10 is stretched in a nonuniform manner. This is because the pressure applied to the electrode sheet 10 at the moment of rolling is not uniformly applied to the entire electrode sheet 10.

In the case of cutting the rolled electrode sheet to prepare a single sheet of electrodes, shapes of the electrodes derived from the non-uniformly stretched electrode sheet may be slightly different.

Accordingly, there is a high demand for a technique capable of preparing a plurality of electrodes in a uniform form.

DISCLOSURE

Technical Problem

The present disclosure has been made to solve the above-described problems of the related art and technical problems which were identified in the past.

Specifically, the present disclosure is directed to provide a method of preparing electrodes capable of obtaining an electrode sheet having a uniform shape while improving preparation processability of the electrodes.

Technical Solution

The present disclosure provides a method of preparing an electrode for an electrode assembly having a structure in which electrodes are laminated, including:

(i) a process of coating an electrode mixture on at least one surface of a metal sheet so that n (n≥2) electrode mixture coated layer lines are formed between non-coated portions parallel to a first direction;

(ii) a process of rolling the metal sheet sequentially from a first electrode mixture coated layer line to an $n^{th}$ electrode mixture coated layer line using a rolling roller rotated in a second direction perpendicular to the first direction;

(iii) a process of slitting the rolled metal sheet at least twice in the second direction to prepare electrode plate base materials having an electrode mixture coated layers formed thereon; and (iv) a process of cutting each of the electrode plate base materials in the first direction to obtain n single sheet electrodes.

That is, in the method of preparing an electrode according to the present disclosure, the rolling is performed in the second direction perpendicular to the electrode mixture coated layer lines parallel to the first direction, and thus only at least one electrode mixture coated layer line is rolled during the rolling process. That is, the rolling is performed in a state in which the rolling roller is in close contact with all of the electrode mixture coated layer lines at the moment of rolling, and thus a pressure may be uniformly applied to the entire sheet.

Furthermore, since a rolling principle is the same up to the $n^{th}$ electrode mixture coated layer line, a stretching degree of the entire metal sheet is uniform and a shape of the electrodes obtained therefrom is also uniform.

The processes (iii) and (iv) may be performed simultaneously. In this case, the electrode base materials may be processed into a plurality of single electrodes at the same time that the electrode base materials are prepared by using a single machining apparatus, for example, an apparatus capable of cutting the electrode base materials and cutting the electrode base materials into the plurality of single electrodes.

A width of the non-coated portion may be appropriately adjusted in consideration of a length of an electrode tab, and may generally be 5 mm to 20 mm, more preferably be 8 mm to 18 mm, and most preferably be 10 mm to 15 mm. When the width of the non-coated portion exceeds 20 mm, it is not preferable in terms of economic feasibility. However, as necessary, the width of the non-coated portion may not to be limited to the above ranges and be appropriately selected.

The pressure applied to the electrode sheet is preferably in a range of 10 to 100 tons/cm$^2$ for a negative electrode and in a range of 30 to 300 ton/cm$^3$ for a positive electrode. When a pressure lower than a lower limit value is applied to the electrode sheet, it is not preferable in terms of the electrical characteristics of the electrode. When the pressure exceeding an upper limit value is applied, the electrode mixture may be broken, which is also not preferable.

Alternatively, the processes (iii) and (iv) may be performed sequentially, and in this case, the two processes may be performed through a different processing apparatus.

The process (iii) may further include a process of vacuum drying the electrode plate base material after the slitting process is performed.

In a metal sheet having a relatively long length with respect to its width, the first direction may be a direction corresponding to the width of the metal sheet on a plane, and the second direction may be a direction corresponding to the length of the metal sheet on the plane.

In one specific example, the electrode plate base material may have a structure in which the n electrode mixture coated layers are formed in the second direction with non-coated portions interposed therebetween.

Here, based on the electrode mixture coated layer, the non-coated portion of one side is cut in the first direction to have a shape of an electrode tab, and an end portion of an electrode mixture coated layer adjacent to the non-coated portion of the other side is simultaneously cut in the first direction to obtain an electrode from the electrode plate base material.

When the non-coated portion of one side is cut in the form of the electrode tab and the end portion of the electrode mixture coated layer adjacent to the non-coated portion of the other side is cut, a cutting margin may be secured by cutting a portion adjacent to the outer peripheral end portion of the electrode mixture coated layer.

In some cases, when the end portion of the electrode mixture coated layer adjacent to the non-coated portion of the other side is cut, corners of both of the side end portions may also be chamfered.

As in the above example, in the method according to the present disclosure, the metal sheet having a relatively long length with respect to its width is processed into a relatively small sized electrode base material to prepare an electrode, and thus a processing apparatus may be compactly designed.

In the present disclosure, the electrode mixture may be a positive electrode mixture or a negative electrode mixture. Accordingly, the electrode preparing method according to the present disclosure may be used for preparing both a positive electrode and a negative electrode.

The present disclosure also provides an electrode assembly preparing method including the electrode preparing method and an electrode assembly.

In the electrode assembly preparing method, electrodes prepared by the electrode preparing method are prepared to be an electrode assembly through subsequent processes.

The subsequent processes may specifically be at least one process selected from:

a process of laminating the electrodes prepared by the electrode preparing method with a separator interposed therebetween;

a process of laminating the electrodes and the separator after laminating the electrodes prepared by the electrode preparing method with the separator interposed therebetween; and a process of winding a separation film in a state in which unit cells are arranged on the separation film, wherein the unit cells each have a structure in which the electrodes prepared by the electrode preparing method are laminated and/or stacked with the separator interposed therebetween.

The process of laminating the electrodes with the separator interposed therebetween may be, as an example, a process of preparing an electrode assembly having a structure in which the electrodes are laminated while the electrodes are not in close contact with the separator by a single separator being interposed between the electrodes.

As another example, the process of laminating the electrodes with the separator interposed therebetween may be a process of preparing an electrode assembly in which the electrodes are laminated while the electrodes are not in close contact with the separator by one separator being repeatedly bent from one direction to a direction opposite the one direction in a structure in which the one separator is passing through spaces between all of the electrodes.

The present disclosure also provides battery cells including the electrode assembly.

A type of a secondary battery of the present disclosure is not particularly limited, but specific examples thereof include a lithium-ion secondary battery, a lithium polymer secondary battery, a lithium ion polymer secondary battery, or the like which have advantages of high energy density, high discharge voltage, output stability, and the like.

Generally, a lithium secondary battery is composed of a positive electrode, a negative electrode, a separator, and a nonaqueous electrolyte solution containing a lithium salt.

The positive electrode is prepared, for example, by coating a mixture of a positive electrode active material, a conductive material, and a binder on a positive electrode current collector and/or an extended current collector and then drying the resultant, and a filler may be further added to the mixture as necessary.

The positive electrode current collector and/or the extended current collect part may be generally manufactured to a thickness of 3 to 500 μm For the positive electrode current collector, a material not inducing the chemical change and having a high conductivity may be used without limitation. Examples of the positive electrode current collector and the extended current collect part may include stainless steel, aluminum, nickel, titanium, sintered carbon, or an aluminum or stainless steel surface treated with carbon, nickel, titanium or silver. The positive electrode current collector may have fine irregularities on the surface thereof to increase an adhesiveness of the positive electrode active material, and may have various shapes such as a film, a sheet, a foil, a net, a porous body, a foam, and a non-woven fabric, etc.

Examples of the positive electrode active material may include, for example, a layered compound of lithium cobalt oxide ($LiCoO_2$), lithium nickel oxide ($LiNiO_2$), etc. or a substituted compound with one or more transition metals; lithium manganese oxide such as $Li_1+xMn_2-xO_4$ (in which x is 0 to 0.33), $LiMnO_3$, $LiMn_2O$, $LiMnO_2$, etc.; lithium copper oxide ($Li_2CuO_2$); vanadium oxide such as $LiV_3O_8$, $LiFe_3O_4$, $V_2O_5$, $CuZV_2O_7$, etc.; Ni site-type lithium nickel oxide represented by Chemical Formula of $LiNi1-xMxO_2$ (in which, M=Co, Mn, Al, Cu, Fe, Mg, B or Ga, x=0.01 to 0.3); lithium manganese complex oxide represented by Chemical Formula $LiMn_2-xMxO_2$ (in which M=Co, Ni, Fe, Cr, Zn or Ta, and x=0.01 to 0.1) or $Li_2Mn_3MO_8$ (in which, M=Fe, Co, Ni, Cu or Zn); $LiMn_2O_4$ in which a portion of Li is substituted with alkaline earth metal ions; a disulfide compound; $Fe_2(MoO_4)_3$, and the like. However, the present disclosure may not be limited thereof.

The conductive agent is generally added so that the conductive agent has 1 to 30 wt % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, thermal black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode may be prepared by applying and drying a negative electrode active material to a negative electrode current collector and/or an extended current collect part. Optionally, the above-mentioned components may be selectively added to the negative electrode active material as needed.

The negative electrode current collector and/or the extended current collect part may be generally manufactured to a thickness of about 3 to 500 μm. For the negative electrode current collector and/or the extended current collect part, a material not inducing chemical change and having conductivity may be used without limitation. Examples of the negative electrode current collector and the extended current collect part may include copper, stainless steel, aluminum, nickel, titanium, baked carbon, or copper or stainless steel surface-treated with carbon, nickel, titanium, silver, etc., aluminum-cadmium ally, etc. Further, similarly to the positive electrode current collector, the negative electrode current collector and/or the extended current collect part may have fine irregularities on the surface thereof to increase an adhesiveness of the negative electrode active material, and may have various shapes such as a film, a sheet, a foil, a net, a porous body, a foam, and a non-woven fabric, etc.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode, and an insulating thin film having high ion permeability and mechanical strength is used. A pore diameter of the separator is generally 0.01 to 10 μm, and a thickness thereof is generally 5 to 300 μm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The electrolytic solution may be a non-aqueous electrolytic solution containing a lithium salt, and may include a non-aqueous electrolytic solution and a lithium salt. Examples of the non-aqueous electrolytic solution may include non-aqueous organic solvent, organic solid electrolyte, inorganic solid electrolyte, etc., but may not be limited thereof.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas, and may further include fluoro-ethylene carbonate(FEC), propene sultone (PRS), etc.

In one specific example, a non-aqueous electrolyte containing a lithium salt may be prepared by adding a lithium salt such as $LiPF_6$, $LiClO_4$, $LiBF_4$, $LiN(SO_2CF_3)_2$, etc. to a mixed solvent of a cyclic carbonate of EC or PC, which is a high-dielectric solvent, and a linear carbonate of DEC, DMC or EMC, which is a low viscosity solvent.

Advantageous Effects

As described above, in a method of preparing an electrode according to the present disclosure, rolling is performed in a second direction perpendicular to electrode mixture coated layer lines parallel to a first direction, and thus only at least one electrode mixture coated layer line is rolled during the rolling. That is, the rolling is performed in a state in which a rolling roller is in close contact with the entire electrode mixture coated layer line at the moment of rolling, and thus a pressure can be uniformly applied to an entire sheet.

Furthermore, since a rolling principle is the same up to an $n^{th}$ electrode mixture coated layer line, a stretching degree of the entire metal sheet is uniform, and a shape of electrodes obtained therefrom is also uniform.

Further, conventionally, due to non-uniform elongation of the electrode sheet, electrode tabs are lifted while notching and slitting the electrode sheet, but in the preparing method of the present disclosure, the elongation of the electrode sheet is uniform, thereby preventing a lifting phenomenon.

Further, in the method of preparing an electrode of the present disclosure, it is possible to constitute a roll material having a short side of an electrode as a width, and thus a rolling apparatus can be lightened.

DETAILED DESCRIPTION OF THE PREFERRED EMBODIMENTS

Hereinafter, exemplary embodiments of the present disclosure will be described in detail with reference to the drawings, which are for easing understanding of the present disclosure, and the scope of the present disclosure is not limited thereto.

FIG. 1 shows a process of preparing an electrode by line coating an electrode sheet according to the related art. Referring to FIG. 1, an electrode sheet 10 is formed on a metal sheet in a state in which electrode lines 11 containing an electrode mixture are interposed between non-coated portions 12 which are uncoated areas.

The electrode sheet 10 is rolled while a rolling roller 20 is rotated in a longitudinal direction corresponding to the electrode lines. In this process, a pressure is applied only to the electrode lines 11 but is not applied to the non-coated portions 12 between the electrode lines 11, and thus the entire electrode sheet 10 is stretched in a non-uniform manner.

Figure 2:
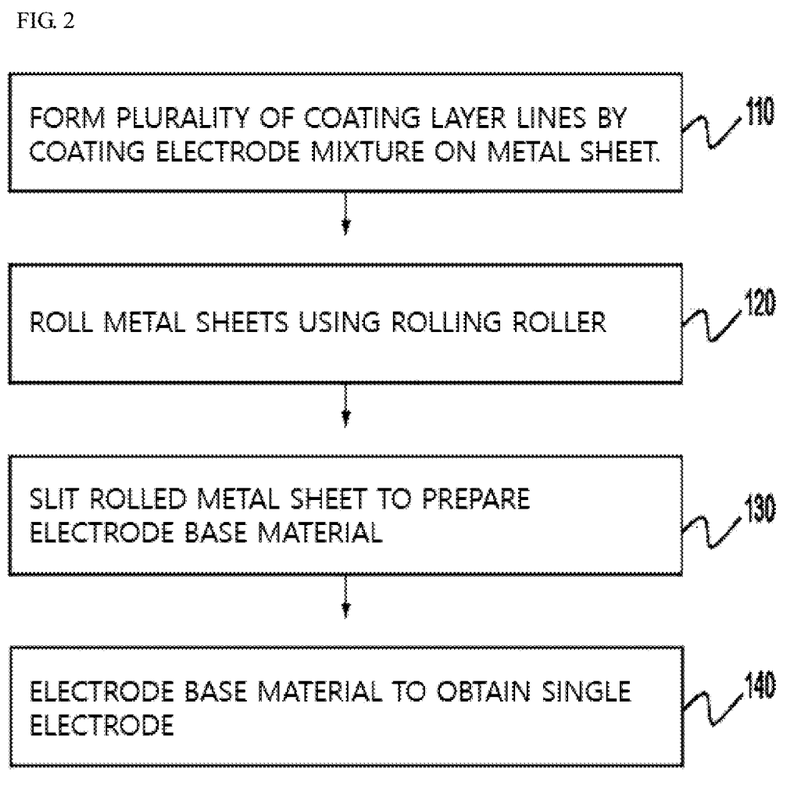
FIG. 2 is a schematic diagram showing an electrode preparing method according to one embodiment of the present disclosure.

FIG. 2 is a flow chart showing an electrode preparing method according to one embodiment of the present disclosure.

In the method of preparing an electrode according to present disclosure, the electrode mixture is coated on a metal sheet 210 in a process 110 to form a plurality of electrode mixture coated layer lines 211, 222, 213 and 214. Thereafter, a process 120 of rolling the metal sheet 210 with a rolling roller 220 is performed. Therefore, a rolling is performed in a state in which the rolling roller 220 is in close contact with all of the electrode mixture coated layer lines 211, 212, 213 and 214 at the moment of rolling, and thus a pressure may be uniformly applied to the entire sheet.

Figure 3:
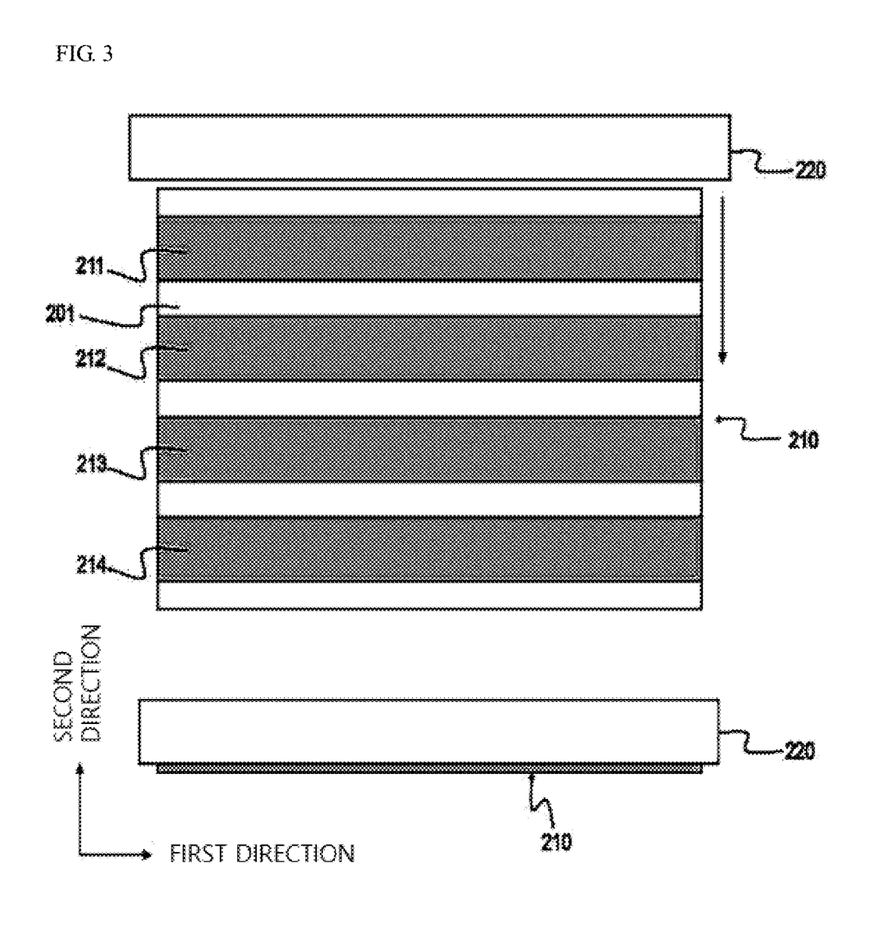
FIG. 3 is a schematic diagram showing use of a metal sheet and a rolling roller according to one embodiment of the present disclosure.

To illustrate the above process more specifically, reference is made to FIG. 3 with FIG. 2, in which the metal sheet 210 according to one embodiment of the present disclosure is shown.

In the process 110, the electrode mixture is coated on one surface of the electrically conductive metal sheet 210 along the first direction so that the electrode mixture coated layer lines 211, 212, 213 and 214 are formed parallel to the first direction with the non-coated portion 201 interposed therebetween.

Not shown in the drawings, the coating of the electrode mixture may be performed through a coater having a plurality of nozzles formed therein. The electrode mixture discharged through the nozzles of the coater may be applied in parallel with each other on the metal sheet 210, and the electrode mixture coated layer lines 211, 212, 213 and 214 having the non-coated portion 201 therebetween may be formed.

In the present disclosure, the first direction is a direction corresponding to a width of the metal sheet 210 on a plane.

The metal sheet 210 on which the electrode mixture coated layer lines 211, 212, 213 and 214 are formed is rolled by the rolling roller 220 in a following process 120.

The rolling roller 220 is rotated in a second direction perpendicular to the first direction and the metal sheet 210 is rolled while being moved in the direction opposite to the rotating direction of the rolling roller 220. In the present disclosure, the second direction is a direction corresponding to a length of the metal sheet 210 on a plane, and a moving direction of the metal sheet 210 by the rolling roller 220 may be also understood as the second direction.

Accordingly, in the method of preparing according to the present disclosure, the rolling is performed in the second direction perpendicular to the electrode mixture coated layer lines 211, 212, 213 and 214 parallel to the first direction, so that the rolling is performed in a state in which the rolling roller 220 is in close contact with all of the electrode mixture coated layer lines 211, 212, 213 and 214 at the moment of rolling, and thus a pressure may be uniformly applied to the entire sheet.

Since a rolling principle is the same up to a final electrode mixture coated layer line 214, a stretching degree of the electrode mixture coated layer lines may be uniform.

After the above processes, a process 130 of slitting the rolled metal sheet 210 to prepare an electrode base material 300 and a process 140 of cutting the electrode base material 300 and obtaining a single electrode by notching and cutting are performed.

Figure 7:
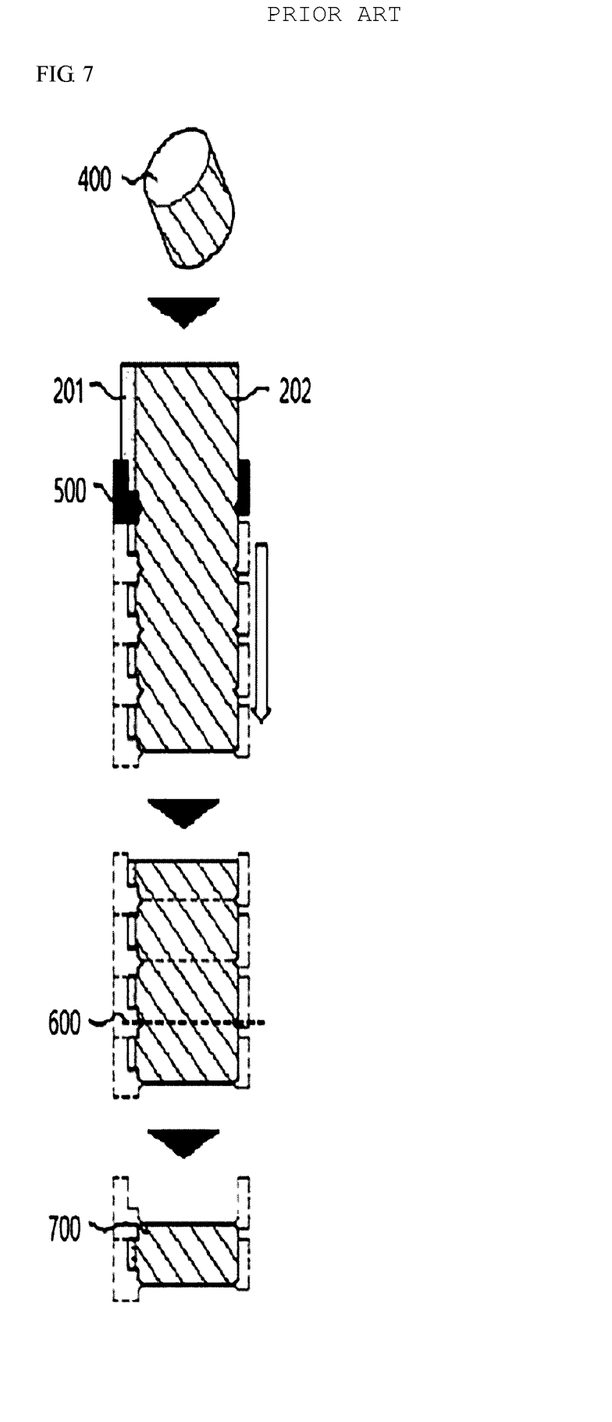
FIG. 7 is a schematic diagram showing processes of slitting and notching a metal sheet according to the related art.

FIG. 7 is a schematic diagram showing processes of slitting and notching a metal sheet according to the related art. Referring to FIG. 7, in the related art, a coated electrode sheet is wound and supplied in a roll unit, and the non-coated portion of the side is processed to form a tab through the notching process. In the notching process, a mold having a shape of a unit electrode is used to cut out a remainder while leaving a part of the metal thin plate for connecting the electrodes in the non-coated portion, and the process may be performed using a laser. The electrode sheet subjected to the notching process is rewound, and the rewound electrode sheet is fed to the cutting process. In the cutting process, the electrode sheet is cut into unit electrodes using the cutter or the laser.

In the coating method according to FIG. 1, due to non-uniform elongation of the electrode sheet, electrode tabs are lifted while notching and slitting the electrode sheet, but in the coating method of the present disclosure, since the pressure due to rolling is uniformly applied to the entire sheet, thereby solving the conventional problem in the process of forming the electrode tab.

Hereinafter, the process 130 and the process 140, which are the process of forming the electrode tab in the present disclosure, will be described in detail with reference to FIGS. 2 to 6, 8 and 9.

Figure 8:
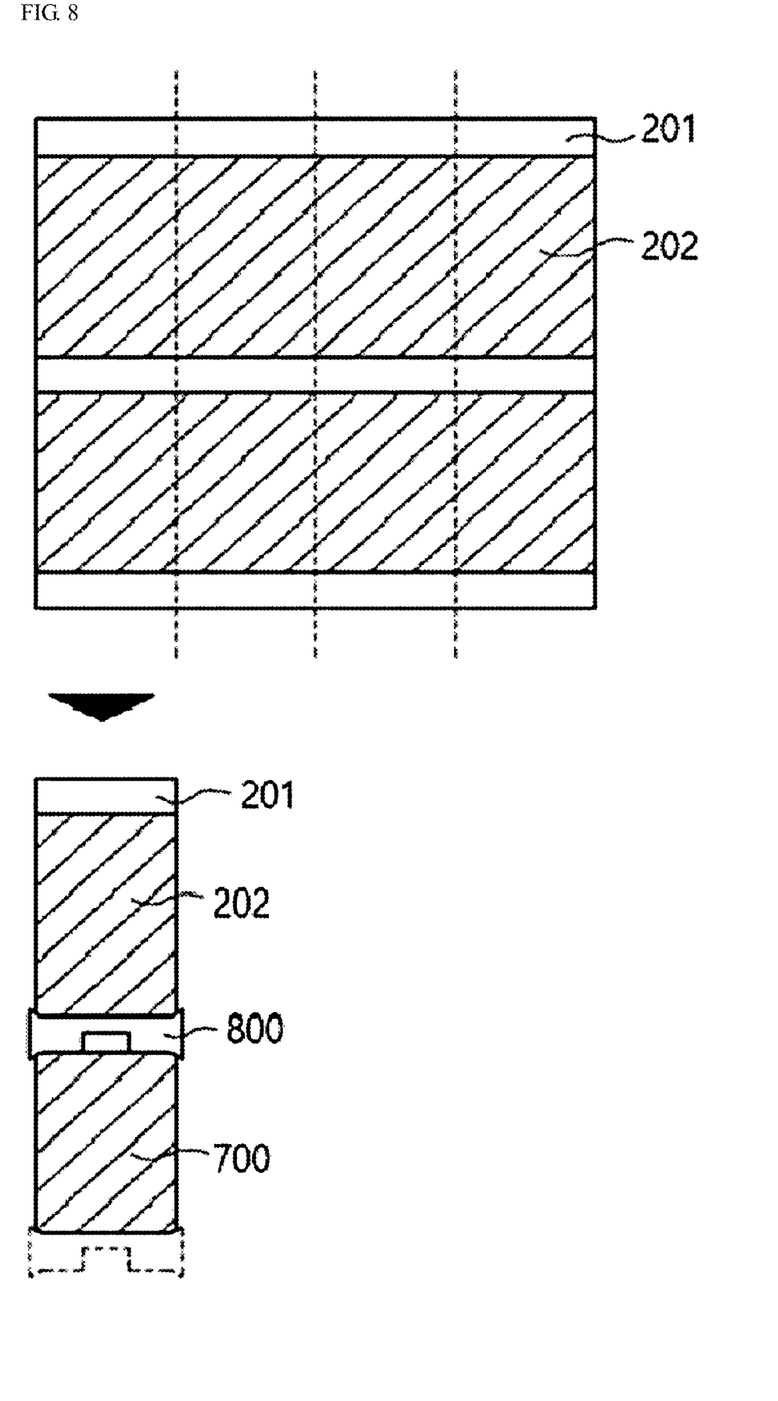
FIG. 8 is an exemplary view showing a process of coating an electrode sheet and a process of preparing an electrode according to the present disclosure in cross section.
Figure 9:
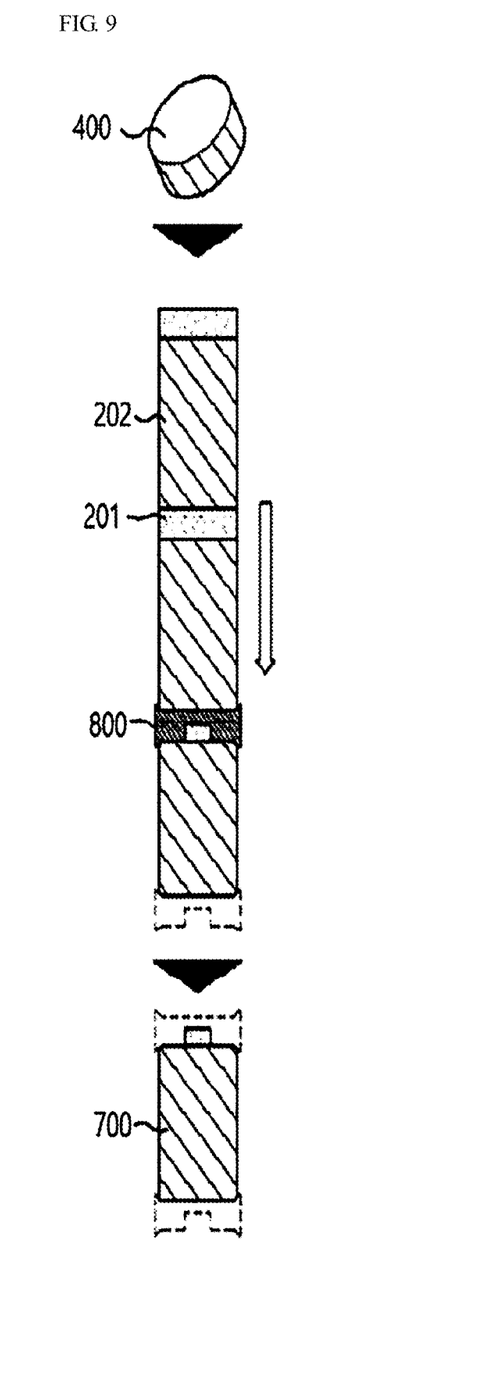
FIG. 9 is a schematic view showing a preparing process of an electrode for a secondary battery according to the present disclosure.

FIG. 8 shows a process of slitting the metal sheet rolled according to the present disclosure in the second direction to obtain an electrode place base material, and FIG. 9 shows a notching and cutting process with the electrode plate base material obtained through the process of FIG. 8.

Figure 4:
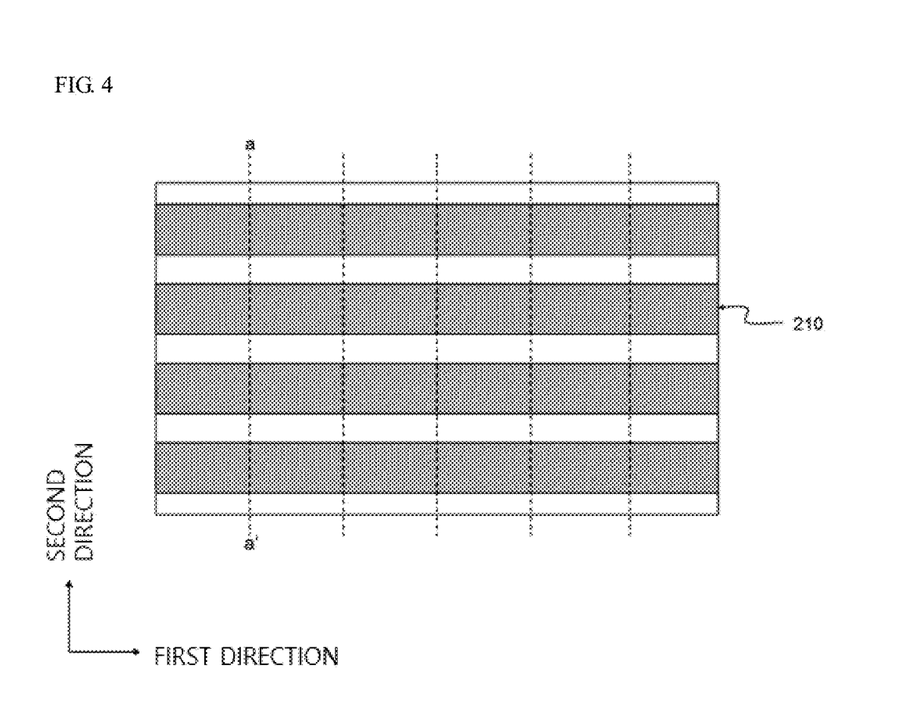
FIG. 4 is a schematic diagram showing a process of slitting an electrode sheet of FIG. 3.

Referring to these drawings, in the process 130, a plurality of perforated lines a-a' corresponding to the second direction are set in the metal sheet 210 rolled in the process 120, and then the metal sheet is slit along the perforated lines. The slit metal sheet 210 is defined as an electrode base material 300 in the present disclosure.

Figure 5:
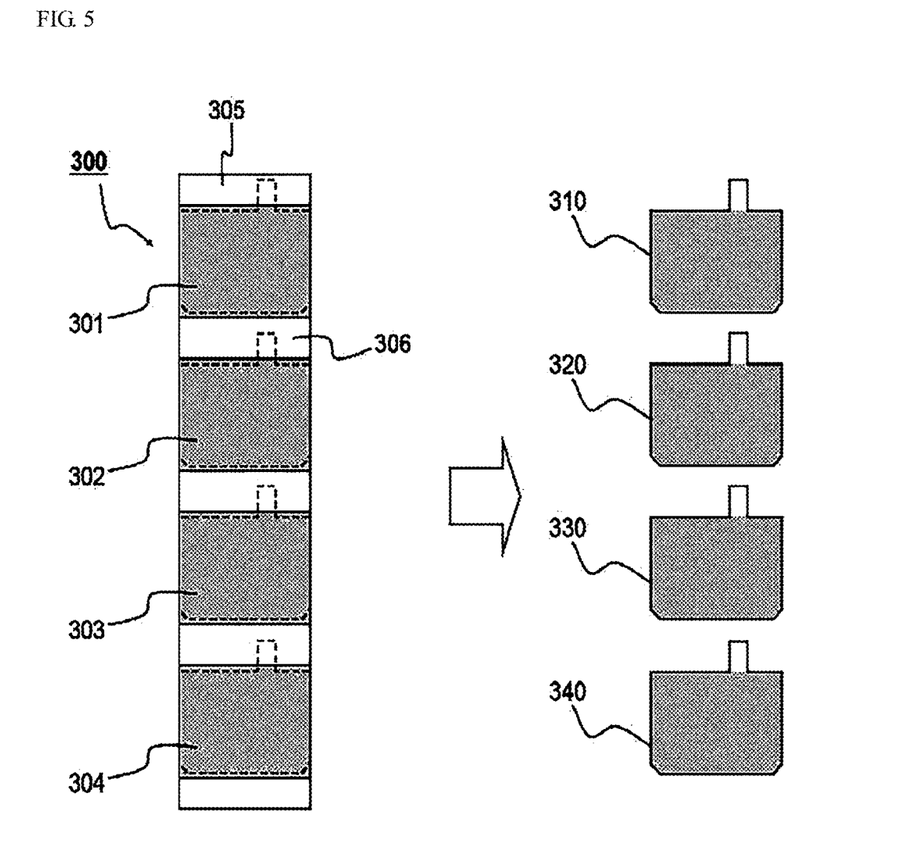
FIG. 5 is a schematic diagram of an electrode base material obtained from the electrode sheet of FIG. 4.

As shown in FIG. 5, the electrode base material 300 has a structure in which four electrode mixture coated layers that are same as the number of the electrode mixture coated layer lines 211, 212, 213 and 214 are formed along the second direction with the non-coated portion 201 therebetween.

Metal base materials 300 obtained from one metal sheet 210 in the process 130 are respectively process into a single electrode corresponding to the number of electrode mixture coated layers 301, 302, 303 and 304 included therein.

In particular, as shown in FIG. 5, based on the electrode mixture coated layer 301, the non-coated portion 305 of one side is cut in the first direction so as to have the shape of the electrode tab 321 and an end part of the electrode mixture coated layer 301 adjacent to the non-coated portion 306 of the other side is cut in the first direction, thereby obtaining an electrode from the electrode base material 300.

Unlike the conventional two-step process of notching and cutting, in the present disclosure, a roll-shaped electrode base material sheet is cut into unit electrodes at once while moving. In particular, the rolled-up electrode base material sheet is continuously fed to a press having a mold whose shape coincides with the shape of the end part and the tab of the unit electrode while being spread, and cut by the mold to obtain unit electrodes.

This is also same for the electrode mixture coated layers 302, 303 and 304.

Figure 6:
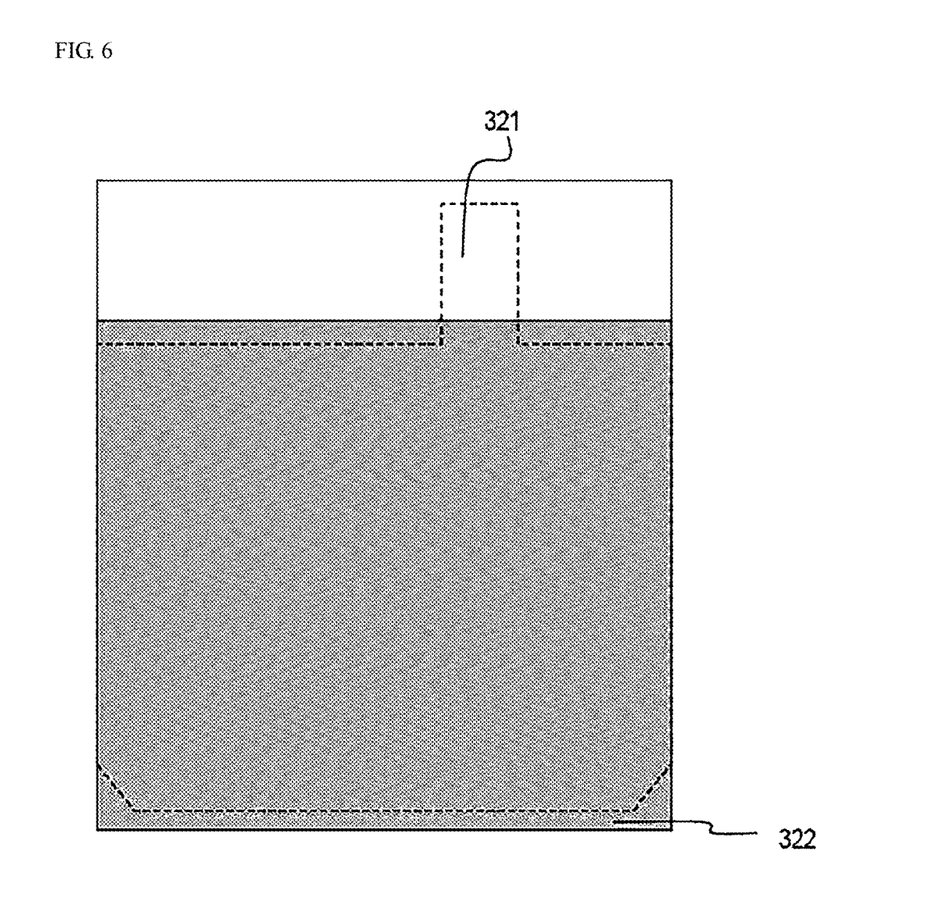
FIG. 6 is an enlarged schematic diagram of an electrode mixture coated layer of FIG. 5.

In particular, when the non-coated portion 201 of one side is cut into the shape of the electrode tab and the end part of the electrode mixture coated layer 301 adjacent to the non-coated portion 201 of the other side is cut, a portion adjacent to an outer peripheral end portion of the electrode mixture coated layer 301 is cut together to secure a cutting margin.

In general, since the outer peripheral end portion of the electrode mixture coated layer is a point where the rolling of the rolling roller is started or terminated, a thickness of the electrode mixture coated layer may be thinner that a center portion of the electrode mixture coated layer. However, in the present disclosure, since the thinner portion is removed by the cutting margin and thus is not included in the electrode, the thickness of the electrode may be relatively uniform.

In addition, in the present disclosure, when cutting the end part of the electrode mixture coated layer adjacent to the non-coated portion 306 of the other side with respect to the non-coated portion 305 on which the electrode tab is formed, corners of both of the side end portions may be also chamfered.

It should be understood by those skilled in the art that various changes may be made without departing from the spirit and scope of the present disclosure.

DESCRIPTION OF SYMBOLS 201, 305, 306: non-coated portion,
202: coated portion
210: metal sheet
211, 212, 213, 214: coated layer lines
220: rolling roller
300: electrode base material
301, 302, 303, 304: electrode mixture coated layer
321: electrode tab
400: electrode sheet roll
500: notching 600: cutting
700: unit electrode
800: mold or cutter

The invention claimed is:

1. A method of preparing an electrode for an electrode assembly having a structure in which electrodes are laminated, comprising:
   (i) a process of coating an electrode mixture on at least one surface of a metal sheet having a relatively long length with respect to its width, so that n (n≥2) electrode mixture coated layer lines are formed, between non-coated portions, parallel to a first direction corresponding to the width of the metal sheet;
   (ii) a process of rolling the metal sheet sequentially from a first electrode mixture coated layer line to an $n^{th}$ electrode mixture coated layer line using a rolling roller rotated in a second direction corresponding to the length of the metal sheet, to form a rolled metal sheet;
   (iii) a process of slitting the rolled metal sheet at least twice in the second direction to prepare electrode plate base materials having n electrode mixture coated layers formed thereon with non-coated portions interposed therebetween; and
   (iv) a process of cutting the non-coated portion in the first direction to form an electrode tab, and simultaneously cutting an end portion of the electrode mixture coated layer adjacent to the non-coated portion in the first direction to obtain an electrode from the electrode plate base material;
   wherein the cutting of (iv) is performed while the electrode base plate is moving;
   wherein a pressure applied by the rolling roller in process (ii) is in a range of 30 to 300 tons/cm$^2$ for a positive electrode and in a range of 10 to 100 tons/cm$^2$ for a negative electrode; and
   wherein (ii) is performed before (iii).

2. The method of claim 1, wherein the processes (iii) and (iv) are performed sequentially.

3. The method of claim 1, when the end portion of the electrode mixture coated layer adjacent to the non-coated portion of the other side is cut, corners of both of the side end portions are also chamfered.

4. The method of claim 1, wherein the process (iii) further includes a process of vacuum drying the electrode plate base material after the slitting process is performed.

5. The method of claim 1, wherein the electrode mixture is a positive electrode mixture or a negative electrode mixture.

6. A method of preparing an electrode assembly comprising the method of preparing an electrode of claim 1, wherein electrodes prepared by the electrode preparing method are prepared to be an electrode assembly through a subsequent process,
   wherein the subsequent process is at least one of: a process of laminating the electrodes prepared by the electrode preparing method with a separator interposed therebetween; a process of laminating the electrodes and the separator after laminating the electrodes prepared by the electrode preparing method with the separator interposed therebetween; or a process of winding a separation film in a state in which unit cells are arranged on the separation film, wherein the unit cells each have a structure in which the electrodes prepared by the electrode preparing method are laminated and/or stacked with the separator interposed therebetween.

7. An electrode assembly prepared by the method of preparing an electrode assembly according to claim 6.

* * * * *